April 8, 1930.  L. G. SCHIMMEL  1,753,535
FAUCET
Filed March 9, 1927

INVENTOR.
Lloyd G. Schimmel
BY
ATTORNEY.

Patented Apr. 8, 1930

1,753,535

UNITED STATES PATENT OFFICE

LLOYD G. SCHIMMEL, OF LOS ANGELES, CALIFORNIA, ASSIGNOR TO PERFECTION FAUCET MFG. CORPORATION, A CORPORATION OF NEVADA

FAUCET

Application filed March 9, 1927. Serial No. 173,989.

This invention relates in general to water faucets such as are used and employed on wash basins and the like, and more particularly to a form of faucet adapted to be self-closing in character in order to prevent leakage, and free from a multiplicity of parts such as gaskets and the like which ordinarily become worn and useless and cause leakage and improper operation of faucets.

Another object is to provide a faucet including a body with a spout, a valve stationarily held therein, a cooperating valve member rotatably mounted with respect to the stationary member, and means externally of the body for rotating the one member with respect to the other for opening and closing the faucet.

Another object is to provide a simplified, efficient form of faucet capable of being easily and readily disassembled for the purpose of cleaning, and of being replaced by persons unskilled in the mechanical arts.

Still other objects may appear as the description progresses.

In the accompanying drawing I have shown a preferred embodiment of my invention, subject to modificaton within the scope of the appended claim without departing from the spirit thereof.

Figure 1:
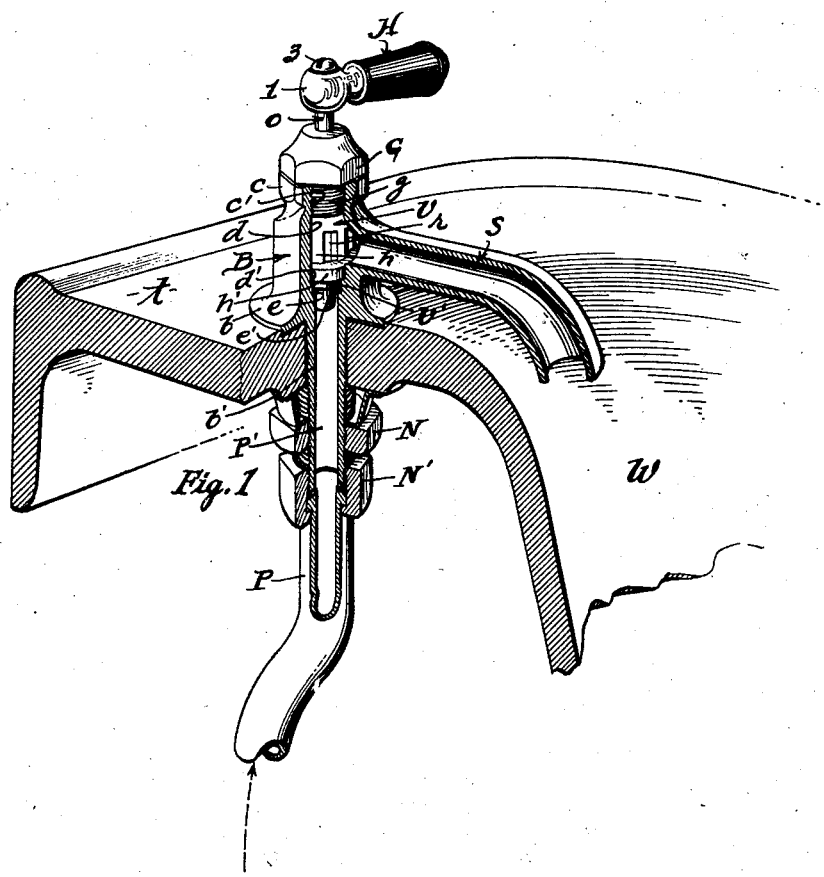
Fig. 1 is a perspective view of my improved faucet attached to a wash basin, the same being partly shown in section.
Figure 2:
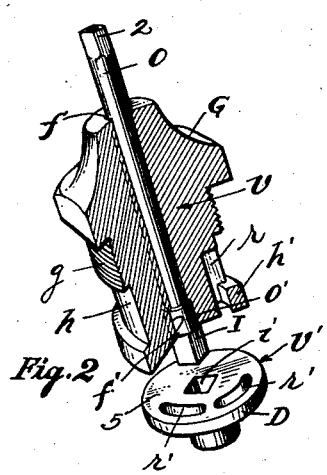
Fig. 2 is a perspective view of the cooperating valve members detached from the faucet, shown in section.

Briefly described, my invention comprises a faucet body B, a stationary valve member V supported within the body, a movable valve member V' cooperating with the member V, a handle H for operating the movable member V', and nuts N and N' by means of which the faucet is supported on a wash basin.

As shown clearly in the drawings, the faucet body B is substantially of the usual form and includes a base flange $b$ adapted to rest upon the top $t$ of the basin W. A hollow stem B' extends from the body B downwardly through the portion $t$ of basin W and is threaded to receive nuts N and N' by means of which the faucet is attached to the basin and to a water inlet pipe P.

The upper end of the body B is provided with a hexagonal portion $c$, which is internally threaded at $c'$, and below said threaded portion the body B is provided with a bore $d$ having an annular shoulder $d'$ at the bottom thereof, and a smaller bore $e$ with a shoulder $e'$ at the bottom thereof. The bores $e$ and $d$ are in communication with the passage P' in the stem B' of the body. The chamber formed in the body B by the bore $d$ is of annular character and is in communication with the usual hollow downwardly turned spout S, extended therefrom and preferably integrally formed on the body.

A faucet valve mounted within the body B is composed of the two members V and V', together with an operating stem O which is loosely seated in a central bore F extending entirely through the member V. Member O has an enlargement O' on the lower end thereof which seats in a counter-bore $f'$ formed in the member V.

Member V is provided with a hexagonal enlargement G at its upper end adapted to abut the hexagonal portion C of the body B when the threaded central portion $g$ thereof is screwed into the internally threaded portion C' of the body. Below the threaded portion $g$ the valve member V is provided with an annular groove or recess H within the chamber $d$ of the body, and below said groove member V has an annular rib or flange $h$ which seats on the annular shoulder $d'$ within the body B.

Member V is also provided with a pair or more of cord recesses $r$, $r$, etc., forming passages for connecting the annular recess H of the stationary valve body V with the chamber $e$ of the body B. The lower end of the member V below the portion $h$ thereof is faced so as to closely lap and fit the face 5 of the movable valve member V', which member has a rectangular central opening $i$ adapted to receive the rectangular end of the operating member O, so that when said member O is turned the member V' will be turned with respect to the member V. Said member V' is provided with a disc D having arcuate openings $r'$, $r'$, therein adapted for registration with the passages $r$, $r$, of the member V. The handle H has the usual hub portion 1 thereon which is attached to the squared end 2 of member O by means of a retaining screw 3.

In operation, when the faucet is assembled in position for use, as shown in the drawing, the stationary valve member V will serve to close the upper open end of the body B, while the portion $h$ thereof will seat on the shoulder $d'$. The member V' will float slightly in the chamber $e$ and the pressure of the water from below will serve to retain the same in close contact with the lower end of the member V, with the openings $r'$, $r'$, out of registration with the passages $r$, $r$, so that the water can not pass from the pipe P into the annular chamber H and from thence to the spout S.

When, however, the handle H is turned the operating member O and the valve V will be correspondingly turned for moving the recesses $r'$, $r'$, into partial or complete registration with the passages $r$, $r$, for permitting water to flow through openings $r'$, passages $r$, chamber $h$, and from said chamber outwardly through the spout S.

It will be noted in this connection that the handle H is capable of being freely turned with practically no resistance, due to the absence of springs and pressure which must usually be overcome in the operation of a faucet.

The member B' is preferably formed of some non-corroding material such as bakelite, or other suitable composition which will not be subject to excessive wear and yet which will wear itself in and thus increase its efficiency the longer the same is in use. The absence of gaskets and the like and packing devices of any kind is to be noted in this connection with my improved faucet.

The entire structure may be die-cast and moulded in the form shown, thus eliminating all unnecessary machine work and making it possible to provide faucets at a minimum cost and maximum efficiency.

What I claim is:

A faucet comprising an integral casing having a longitudinal bore therein open at one end and having an axial inlet and a lateral outlet, an integral valve body detachably held therein and having a head overlying the end of said casing and closing said bore and a portion threaded into the open end of the bore, an annular rib formed on the valve body below said outlet providing an annular chamber in the casing adjacent the outlet, ports being formed in said rib and longitudinal recesses formed in the valve body communicating with said ports, a disk valve engaging the end of the valve body and having ports therein, a stem rotatable in the valve body and connected with said valve, and an operating member on said stem for moving the valve ports to and from registration with the ports in said rib to regulate the passage of the fluid from the inlet to the outlet.

LLOYD G. SCHIMMEL.